United States Patent
Lee et al.

(10) Patent No.: US 11,876,669 B2
(45) Date of Patent: Jan. 16, 2024

(54) COMMUNICATION LINE DETECTION METHOD, SYSTEM THEREFOR, AND NETWORK CONTROL SYSTEM

(71) Applicant: KT CORPORATION, Seongnam-si (KR)

(72) Inventors: Kwang-Koog Lee, Daejeon (KR); So Jin Kim, Seoul (KR); Young-Wuk Lee, Sejong-si (KR)

(73) Assignee: KT Corporation, Seongnam-si (KR)

( * ) Notice: Subject to any disclaimer, the term of this patent is extended or adjusted under 35 U.S.C. 154(b) by 381 days.

(21) Appl. No.: 17/268,853

(22) PCT Filed: Aug. 13, 2019

(86) PCT No.: PCT/KR2019/010337
§ 371 (c)(1),
(2) Date: Feb. 16, 2021

(87) PCT Pub. No.: WO2020/036431
PCT Pub. Date: Feb. 20, 2020

(65) Prior Publication Data
US 2022/0116268 A1 Apr. 14, 2022

(30) Foreign Application Priority Data
Aug. 17, 2018 (KR) .................. 10-2018-0096255

(51) Int. Cl.
*H04L 41/0677* (2022.01)
*H04B 10/071* (2013.01)
(Continued)

(52) U.S. Cl.
CPC ....... *H04L 41/0677* (2013.01); *H04B 10/071* (2013.01); *H04L 41/069* (2013.01); *H04L 41/12* (2013.01); *H04L 43/16* (2013.01)

(58) Field of Classification Search
CPC ............ G01M 11/3109; H04L 41/0677; H04L 41/069; H04L 41/12; H04L 43/16;
(Continued)

(56) References Cited

U.S. PATENT DOCUMENTS

2005/0146426 A1* 7/2005 Pereira ................ H04L 41/0631
340/506
2005/0196167 A1* 9/2005 Nagel ................... H04B 10/071
398/37
(Continued)

FOREIGN PATENT DOCUMENTS

EP 1 521 396 A2 4/2005
JP 2012-256961 A 12/2012
(Continued)

OTHER PUBLICATIONS

"Areal-time algorithm for train position monitoring using optical time-domain reflectometry"; Papp et al.; 2016 IEEE International Conference on Intelligent Rail Transportation (ICIRT); Aug. 23, 2016 (Year: 2016).*
(Continued)

*Primary Examiner* — Benjamin H Elliott, IV
(74) *Attorney, Agent, or Firm* — Sughrue Mion, PLLC

(57) ABSTRACT

A method and system for line fault detection, and a network control system are provided. A line fault detection method of a line fault detection system operated by at least one processor comprises generating a network device vector for each node, whose elements are network devices included in each node connected to both ends of a line, when a fault alarm occurs, setting an element corresponding to the network device in which the fault alarm occurs among the elements of the network device vector as a communication state according to the fault alarm, and determining whether a fault occurred in the line and the network device where the
(Continued)

fault occurred based on the communication state set in the network device vector.

14 Claims, 15 Drawing Sheets

(51) Int. Cl.
  *H04L 41/069* (2022.01)
  *H04L 41/12* (2022.01)
  *H04L 43/16* (2022.01)
(58) Field of Classification Search
  CPC . H04L 41/34; H04L 41/0631; H04L 43/0811; H04L 41/0681; H04L 61/50; H04B 10/071
  See application file for complete search history.

(56) References Cited

U.S. PATENT DOCUMENTS

| | | | | |
|---|---|---|---|---|
| 2007/0014233 | A1* | 1/2007 | Oguro | H04L 41/0677 370/216 |
| 2007/0280682 | A1* | 12/2007 | Sichani | H04L 41/0677 398/5 |
| 2009/0031176 | A1* | 1/2009 | Ide | G06F 11/0709 714/E11.197 |
| 2013/0038865 | A1* | 2/2013 | McClean | G01M 11/3154 356/73.1 |
| 2014/0139337 | A1* | 5/2014 | Piper, Sr. | G08B 13/186 340/541 |
| 2015/0085994 | A1* | 3/2015 | Koyabe | G08B 13/00 379/22.03 |
| 2018/0123687 | A1* | 5/2018 | Chang | H04J 14/0275 |
| 2022/0116268 | A1* | 4/2022 | Lee | H04L 43/0811 |

FOREIGN PATENT DOCUMENTS

| | | |
|---|---|---|
| JP | 5498440 B2 | 5/2014 |
| KR | 10-0500836 B1 | 7/2005 |
| KR | 10-0582541 B1 | 5/2006 |
| KR | 10-0658298 B1 | 12/2006 |
| KR | 10-2009-0044013 A | 5/2009 |
| KR | 10-2010-0067821 A | 6/2010 |
| KR | 10-1151867 B1 | 5/2012 |

OTHER PUBLICATIONS

Online multi-parameter sensing and condition assessment technology for power cables: A review; Song et al.; Electrical Power Systems Research 210; Feb. 8, 2022 (Year: 2022).*
"Research on Fault Location of Process-Level Communication Networks in Smart Substation Based on Deep Neural Networks"; Ren et al.; Digital Object Identifier 10.1109/ACCESS.2020.3002172, Received Jun. 2, 2020, accepted Jun. 9, 2020, date of publication Jun. 15, 2020 (Year: 2020).*
Extended European Search Report dated Apr. 7, 2022 from the European Patent Office in EP Application No. 19850089.4.
International Search Report for PCT/KR2019/010337 dated Jan. 2, 2020 (PCT/ISA/210).

* cited by examiner

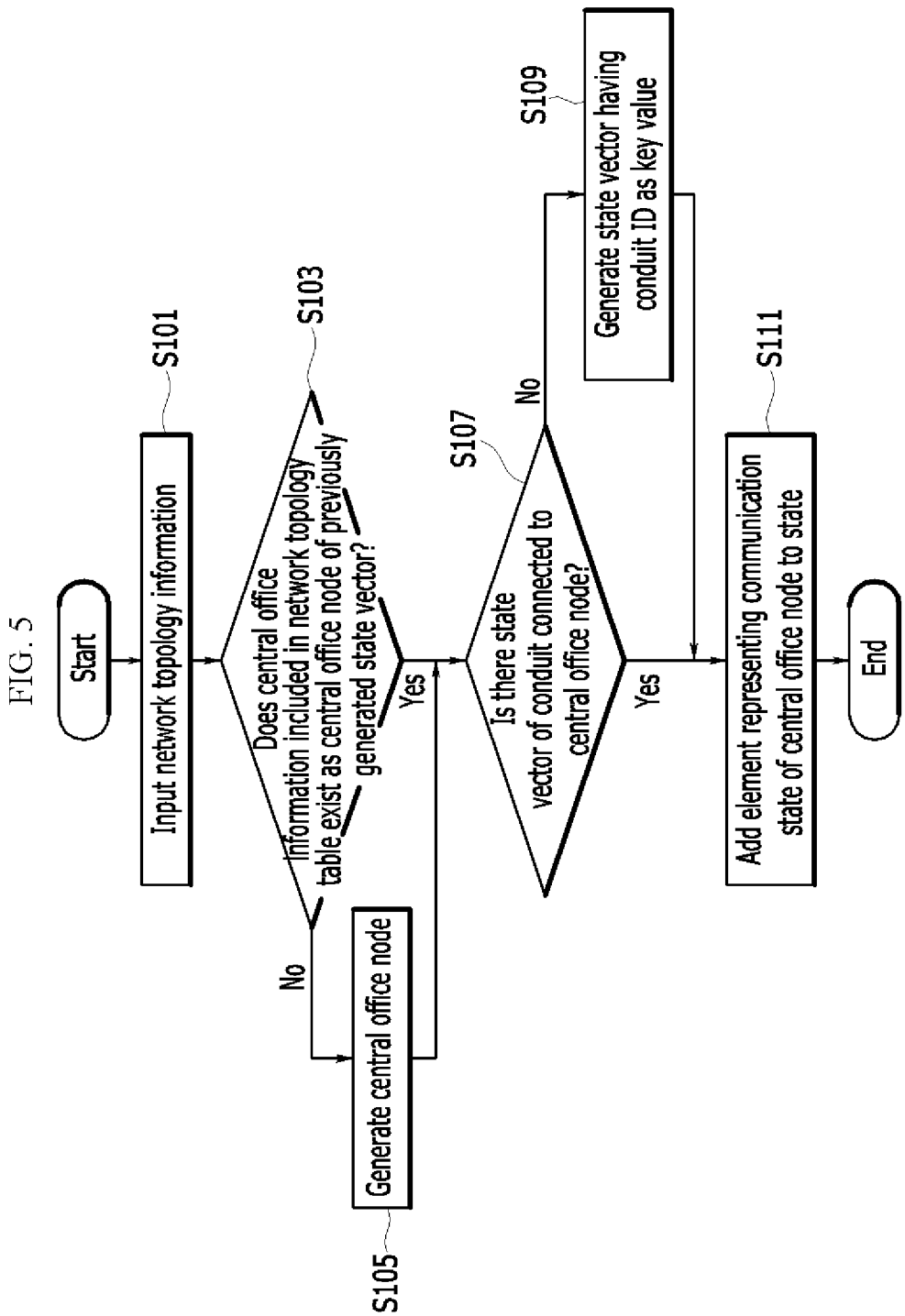

FIG. 6

```
//define class of vector elements including line information
class Vector {
        public String start;   //Site A central office
        public String startSys;   //Site A system name
        public String startSysport;   //Site A port information public String end;   //Site Z central office
        public String endSys;   //Site Z system name
        public String endSysport;   //Site Z port information public String cableID;   //cable ID
        public Vector opposit;   //Information of corresponding cable inte status = 0;   //: information of current state of cable (0: Normal, 1:Abnormal)

public Vector(String a, String b) {
                this.start = a;
                this.end= b;
        } void setSysPort(String a, String b) {
                this.startSysPort = a;
                this.endSysPort= b;
        } void setSysPort(String a, String b) {
                this.startSysPort = a;
                this.endSysPort= b;
        } void setSysPort(String a, String b) {
                this.startSysPort = a;
        } void set2Abnormal() {
                this.status = 1;
        } void set2Abnormal() {
                this.status = 0;
        }

| Equipment | Port | Fault alarm | Occurrence time |
|---|---|---|---|
| MSPP A | slot1/port5 | Loss of Signal (LOS) | 2016/1/1 20:13:01 |
| ROADM A1 | slot10/port6 | Loss of Signal (LOS) | 2016/1/1 20:13:00 |
| PTN A | slot7/port1 | Loss of Signal (LOS) | 2016/1/1 20:13:01 |
| Router A | slot6/port2 | Link Down (LOS) | 2016/1/1 20:13:00 |
| ROADM B1 | slot10/port6 | Loss of Signal (LOS) | 2016/1/1 20:13:01 |
| MSPP B | slot6/port10 | Loss of Signal (LOS) | 2016/1/1 20:13:01 |
| PTN B | slot7/port1 | Loss of Signal (LOS) | 2016/1/1 20:13:01 |
| Router B | slot2/port2 | Link Down (LOS) | 2016/1/1 20:13:01 |
| MSPP C | slot1/port1 | Alarm Indication Signal (AIS) | 2016/1/1 20:13:02 |

401　　403　　405　　407

COMMUNICATION LINE DETECTION METHOD, SYSTEM THEREFOR, AND NETWORK CONTROL SYSTEM

TECHNICAL FIELD

The present invention relates to a method and system for detecting line fault and a network control system.

BACKGROUND ART

In general, a network operator manages locally divided lines, Internet Protocol (IP) networks, transmission networks and the like through various network management systems (NMSs).

According to the current network control method, when a fault occurs in an arbitrary section of a line, the network operator collects alarms generated from network devices connected to the line. Afterwards, the network operator infers the point where the line fault occurred by comprehensively analyzing the fault alarms generated from various domains. And the inferred line fault section is notified to the line management operator who manages the line system so that the line management operator can handle the fault.

As such, the conventional network control method requires the network operator to accurately identify the point of the line fault by analyzing offline various alarm conditions for the fault of the line section connected to the transmission domain and IP domain complicatedly made with a multiplexing hierarchy. Therefore, it takes a considerable amount of time to grasp the connection relationship between the alarms generated in various domains and each separate domain. Further, since consultation with operators in charge of each domain is also required, a lot of overhead occurs in identifying faults.

In order to reduce such overhead, attempts to identify, at a system level, a section where a fault condition occurs by using alarms from conventional network equipment have been made.

However, general line faults cause various alarms not only in the equipment connected to a corresponding line section but also in network equipment having no line fault problem, depending on alarm signal propagation system of network technology. Therefore, it is difficult to accurately estimate the point where a fault actually occurred, which makes it unavoidable to dispatch experts to the site upon misestimating the point.

As such, in conventional network operation, identification of line fault section can be made by accurately analyzing a causal relationship of alarms among domains only through direct intervention of the network operator. Therefore, an additional cost for analysis occurs. Also, as the network complexity increases, the efficiency of network control deteriorates.

DISCLOSURE

Technical Problem

The present invention provides a method and system for detecting line fault on-line based on line connection information between network equipment and alarm information.

The present invention provides a method and system for generating each vector representing a line state for each end of a line and, upon the occurrence of the line fault, detecting a line section where a fault occurs.

Technical Solution

According to an embodiment of the present invention, a line fault detection method of a line fault detection system operated by at least one processor is provided. The method comprises generating a network device vector for each node, whose elements are network devices included in each node connected to both ends of a line, when a fault alarm occurs, setting an element corresponding to the network device in which the fault alarm occurs among the elements of the network device vector as a communication state according to the fault alarm, and determining whether a fault occurred in the line and the network device where the fault occurred based on the communication state set in the network device vector.

Generating the network device vector may comprise generating a first network device vector having as an element at least one first network device belonging to a first node connected to one end of the line, and generating a second network device vector that has, as an element, at least one second network device connected to each of the at least one first network device and belonging to a second node connected to the other end of the line. Further, setting the element may comprise setting an element of the first network device in which the fault alarm occurred, among the elements of the first network device vector, as a communication state according to the fault alarm, and setting an element of the second network device in which the fault alarm occurred, among the elements of the second network device vector, as a communication state according to the fault alarm.

Determining whether the fault occurred may comprise performing a logical sum (OR) operation between elements of the first network device vector and the second network device vector, and determining a state of the line by using communication state of each element of a result vector derived through the OR operation.

Determining whether the fault occurred may comprise determining the state of the line as a fault state, when the communication state of all elements of the result vector represents a fault state or when the communication state of an element indicating a network device directly connected to the line, among the elements of the result vector, represents a fault state.

Determining whether the fault occurred may comprise determining the state of the line as a partial fault state, when the number of elements representing that the communication state is in the fault state, among the elements of the result vector, is greater than or equal to a threshold value.

The line fault detection method may comprises, prior to generating the network device vector, generating topology information including interconnected node IDs, a network device ID, a port ID of a network device, and a line ID, based on line connection information among network devices belonging to each node connected to both ends of at least one line. And, generating the network device vector may comprise detecting node IDs with the same line ID, selecting at least one network device ID matched to each of the detected node IDs, and generating a network device vector for each node ID, each of which has the selected network device ID as an element.

To the line ID, a same conduit ID or a different conduit ID may be assigned. The network device vector may have network IDs having different port IDs as elements, when the same conduit ID is assigned to the line ID.

According to another embodiment of the present invention, a line fault detection system is provided. The system comprises a vector generator that generates a network device vector, for each node, having network devices included in each node connected to both ends of the line as elements, and a vector manager that, upon occurrence of a communication alarm, sets an element corresponding to a network device in which the communication alarm occurred as a communication state according to the communication alarm and determines a state of the line based on the communication state set on the network device vector. Here, the vector generator may set the elements of the network device vector generated for each vector so that the network devices connected to each other through the line correspond to each other.

The vector generator may generate a first network device vector that has, as an element, at least one first network device belonging to a first node connected to one end of the line, and a second network device vector that has, as an element, at least one second network device connected to each of the at least one first network device and belonging to a second node connected to the other end of the line. Further, the vector manager may set an element of the first network device in which the fault alarm occurred, among the elements of the first network device vector, as a communication state according to the fault alarm, and sets an element of the second network device in which the fault alarm occurred, among the elements of the second network device vector, as a communication state according to the fault alarm.

Here, the communication state may include a normal state and a fault state. The vector manager may determine a state of the line depending on whether the communication state of each element of a result vector derived from an OR operation between the first network device vector and the second network device vector is the normal state or the fault state.

The vector manager may determine the line as the normal state when all elements of the result vector represents the normal state, may determine the line as the fault state when all elements of the result vector represents the fault state, and may determine the line as a partial fault state when some elements of the result vector represents the fault state.

According to another embodiment of the present invention, a network control system is provided. The network control system comprises a line fault detection system that generates a network device vector, for each line, including communication states of network devices interconnected through the line as elements and generates line state information by determining a state of the line based on the communication states, and a line management system that receives the line state information from the line fault detection system, measures the state of the line identified from the line state information, determines finally the state of the line based on the result of measuring the state of the line, and provides the finally determined state of the line to the line fault detection system.

The line fault detection system may generate the network device vector for each node connected to both ends of the line, and, when a communication alarm occurs, may set an element corresponding to the network device in which the communication alarm occurs among the elements of the network device vector as a communication state represented by the communication alarm. Then, the line fault detection system may determines the state of the line as at least one of a normal state, a fault state, and a partial fault state by using the communication state.

The line management system may perform optical loss measurement for the line identified from the line state information with an optical time domain reflectometer (OTDR), may determine either the fault state or the normal state of the line based on a result of the optical loss measurement, and provides the determined state of the line to the line fault detection system, and may perform failover when it is determined that the line is in the fault state based on the result of the optical loss measurement.

Advantageous Effects

According to the present invention, a vector representing a state of the line is generated, and a line section on which the fault occurs can be identified based on the vector when a line fault occurs. Thus, the line fault occurring in real-time can be checked on-line, which makes the efficiency of network control to be improved.

In addition, a line fault detection process can be performed quickly and measures according to the source fault can be promptly taken. Thus, the quality of the service line can be improved.

In addition, the line fault detection and recovery can be performed promptly through an automated work process between a line fault detection system and a line management system. Therefore, it is possible to minimize the cost of unnecessary measurement and dispatch of operators and field personnel, thereby increasing the efficiency of network operation.

DESCRIPTION OF THE DRAWINGS

FIG. 5 is a flowchart showing a state vector generation process according to an embodiment of the present invention.

FIG. 6 is an example of a code for defining a class of a vector element containing line information according to an embodiment of the present invention.

FIG. 7 is an example diagram of a fault alarm according to an embodiment of the present invention.

MODE FOR INVENTION

Figure 1:
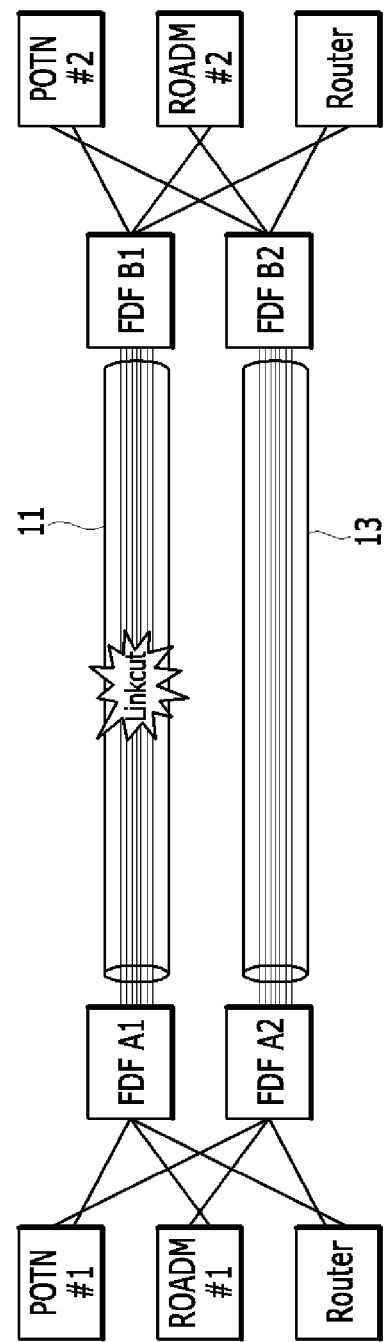
FIG. 1 is a conceptual diagram for explaining a line fault according to an embodiment of the present invention.

Hereinafter, embodiments of the present invention will be described in detail with reference to the attached drawings so that the person of ordinary skill in the art may easily implement the present invention. However, the present invention may be modified in various ways and is not limited to the embodiments described herein. In the drawings, elements irrelevant to the description of the present invention are omitted for simplicity of explanation, and like reference numerals designate like elements throughout the specification.

Throughout the specification, when a part is referred to "include" a certain element, it means that it may further include other elements rather than exclude other elements, unless specifically indicates otherwise.

FIG. 1 is a conceptual diagram for explaining a line fault according to an embodiment of the present invention.

Referring to FIG. 1, a first communication line 11 is connected to packet-optical transport network (POTN) #1, reconfigurable optical add-drop multiplexer (ROADM) #1, and a router via fiber distribution frame (FDF) A1, respectively. Further, the first communication line 11 is connected to POTN #2, ROADM #2, a router via FDF B1.

A second communication line 13 is connected to POTN #1, ROADM #1, and the router via FDF A2. Further, the second communication line 13 is connected to POTN #2, ROADM #2, the router via FDF B2.

As described above, each of the first communication line 11 and the second communication line 13 is a common facility connected to a plurality of network devices independent from each other (FDF A1, FDF A2, FDF B1, FDF B2, POTN #1, ROADM #1, POTN #2, ROADM #2, and router). If a line fault occurs on the communication lines 11 and 13, network devices connected to both ends of the communication lines 11 and 13 generate a fault alarm simultaneously. Alternatively, if fault alarms occur simultaneously in the network devices connected to both ends of communication lines 11 and 13, it can be understood that a fault has occurred in communication lines 11 and 13 after all.

In an embodiment of the present invention, a state vector representing a state of a communication line is generated based on connection information among a plurality of network devices independent from each other, and a line fault is detected using the state vector. Hereinafter, the configuration as such will be described with reference to FIG. 2 to FIG. 10.

Figure 2:
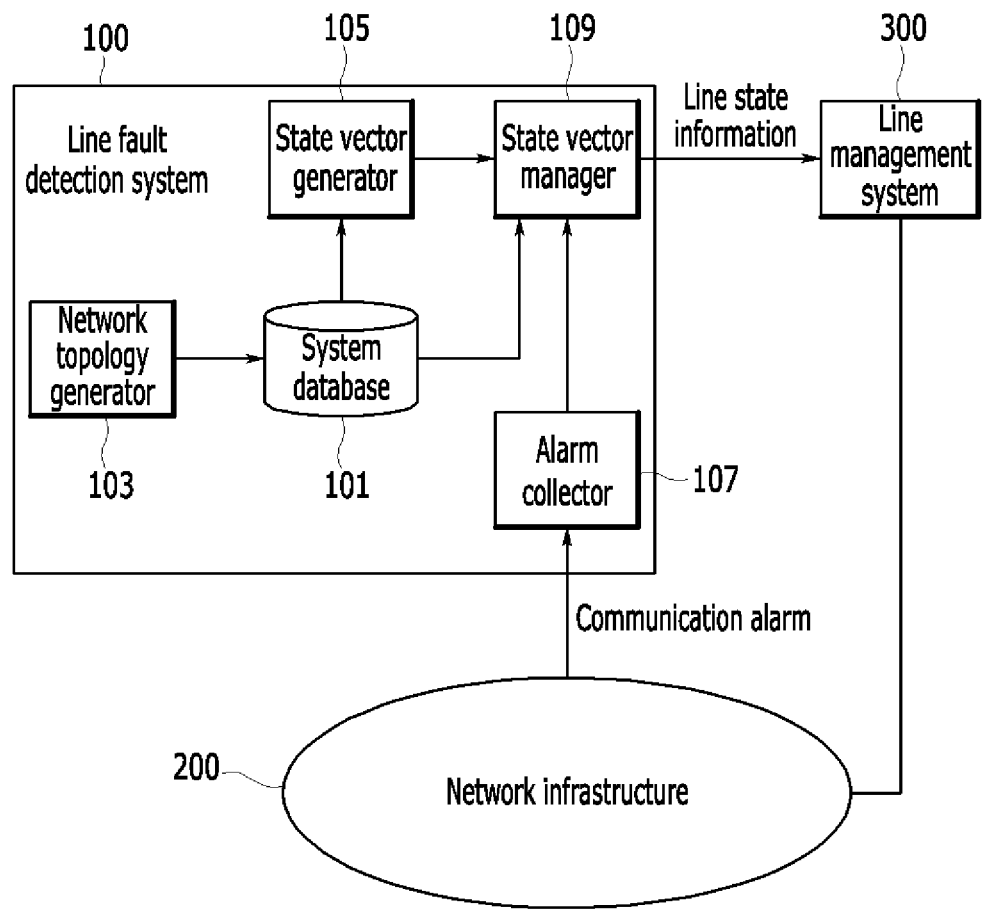
FIG. 2 is a diagram showing connection relationship between a line fault detection system and peripheral configuration according to an embodiment of the present invention.
Figure 3:
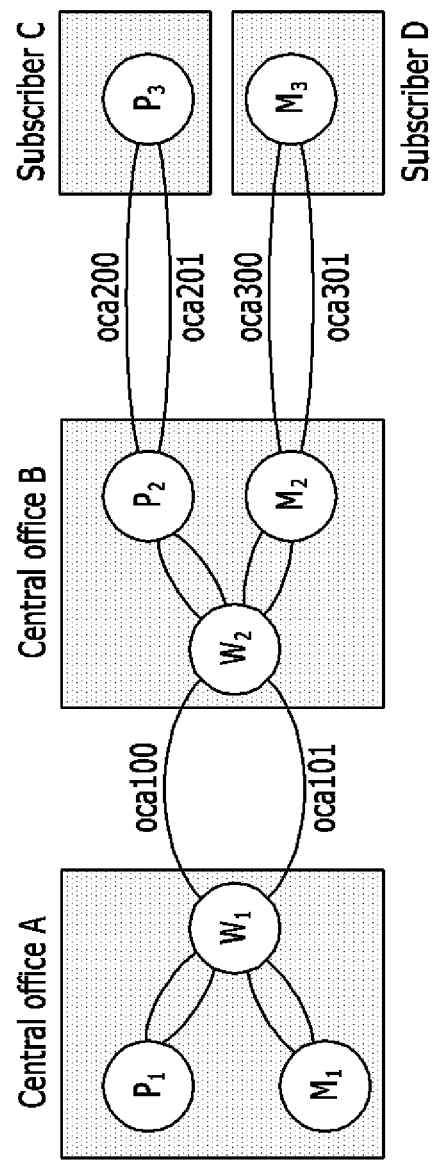
FIG. 3 is an example diagram of a network infrastructure for generating a network topology according to an embodiment of the present invention.
Figure 4:
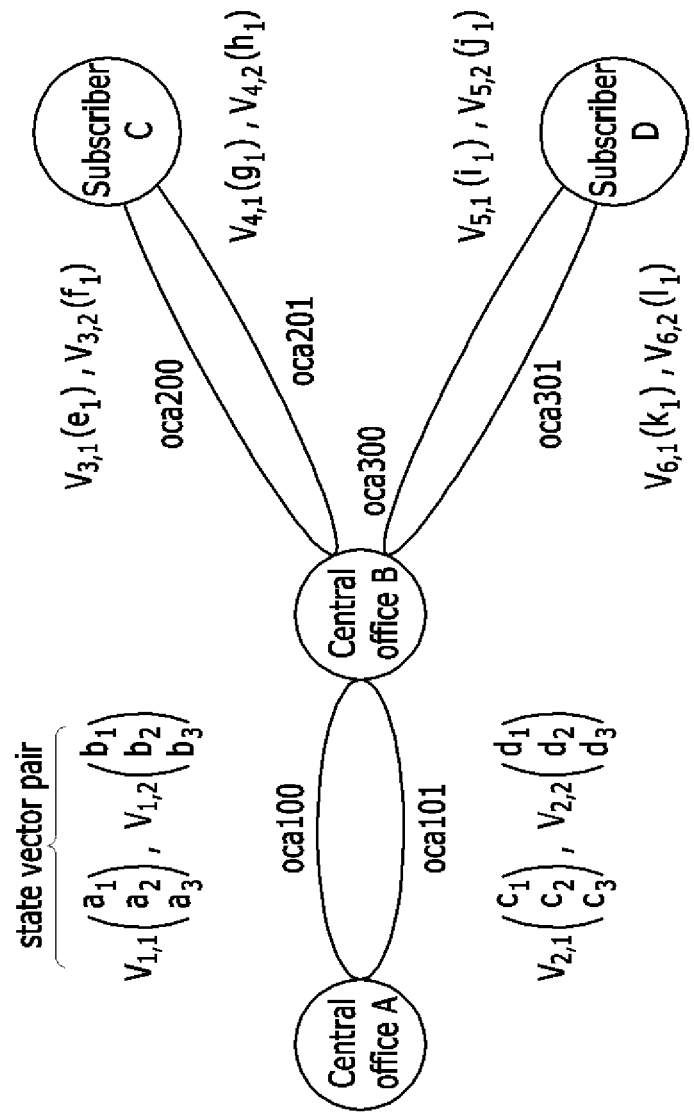
FIG. 4 is an example diagram for explaining generation of a state vector according to an embodiment of the present invention.
Figure 8:
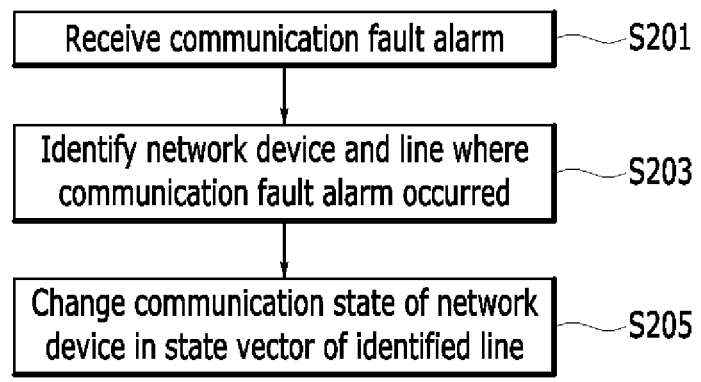
FIG. 8 is a flowchart showing a line state change process according to an embodiment of the present invention.
Figure 9:
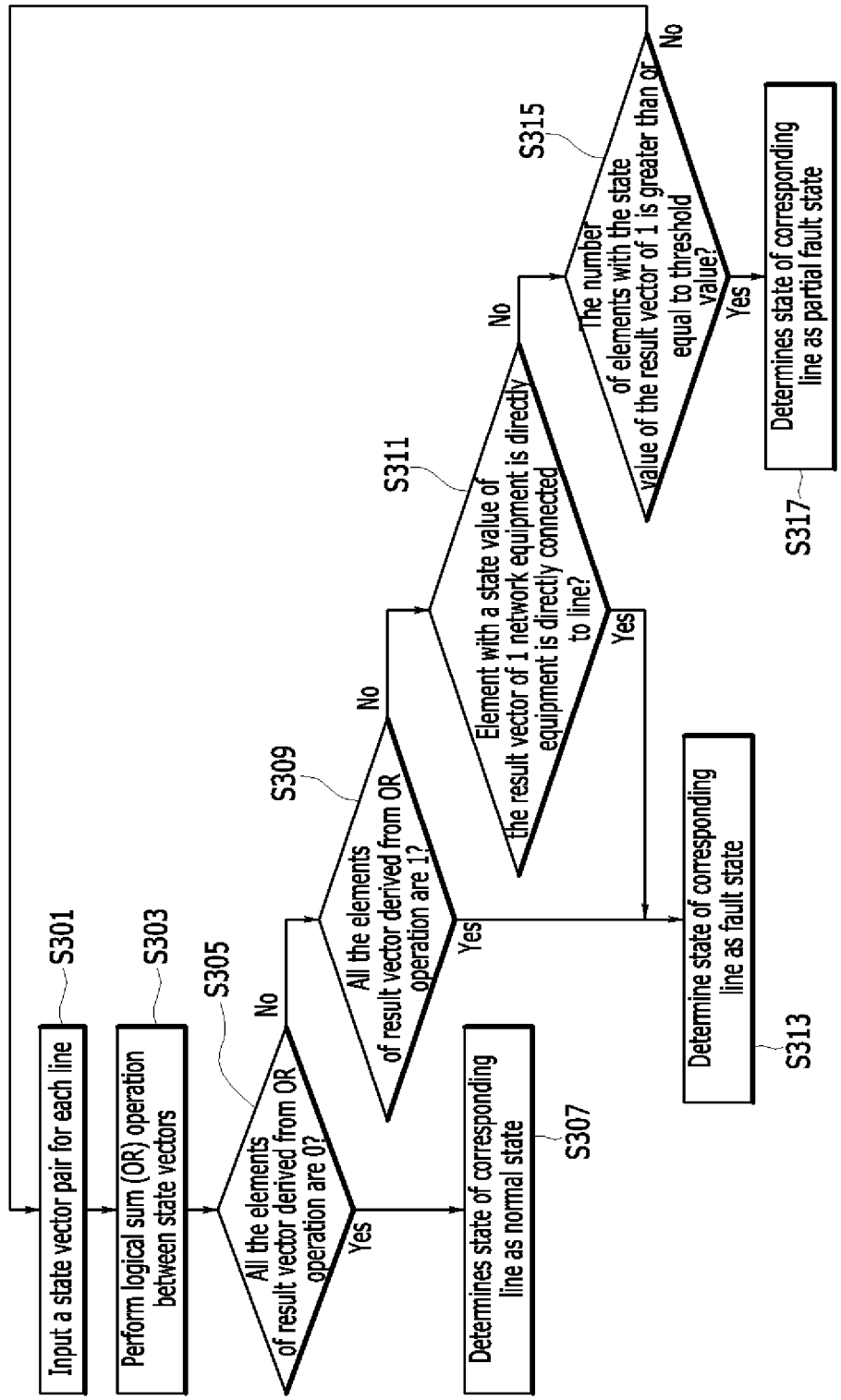
FIG. 9 is a flowchart showing a line state determination process according to an embodiment of the present invention.
Figure 10:
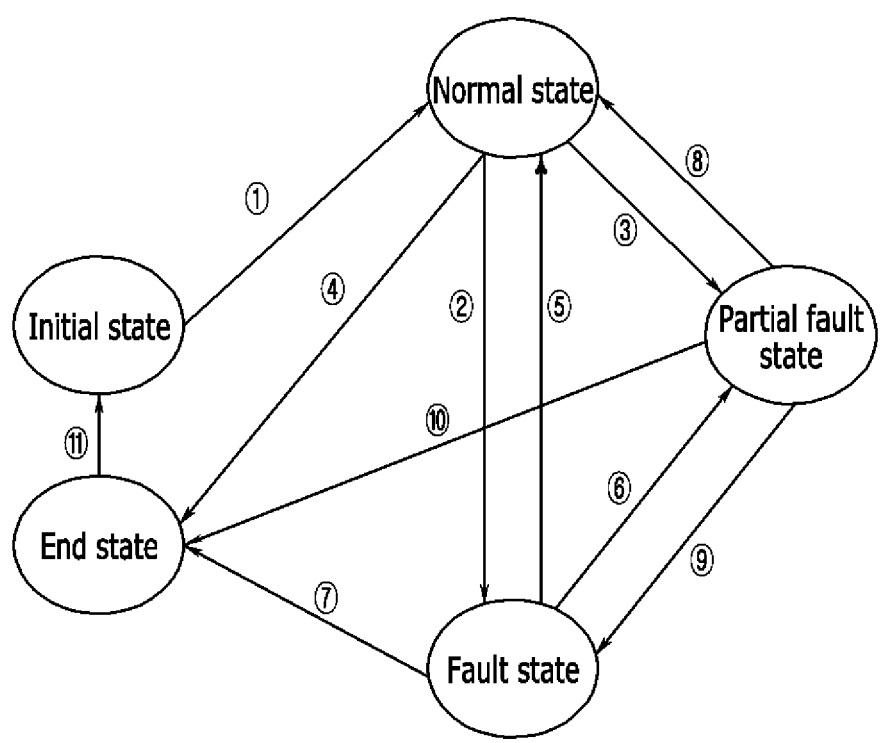
FIG. 10 is a diagram showing a line state transition process according to an embodiment of the present invention.

FIG. 2 is a diagram showing connection relationship between a line fault detection system and peripheral configuration according to an embodiment of the present invention, and FIG. 3 is an example diagram of a network infrastructure for generating a network topology according to an embodiment of the present invention. FIG. 4 is an example diagram for explaining generation of a state vector according to an embodiment of the present invention, and FIG. 5 is a flowchart showing a state vector generation process according to an embodiment of the present invention. FIG. 6 is an example of a code for defining a class of a vector element containing line information according to an embodiment of the present invention, and FIG. 7 is an example diagram of a fault alarm according to an embodiment of the present invention. FIG. 8 is a flowchart showing a line state change process according to an embodiment of the present invention, FIG. 9 is a flowchart showing a line state determination process according to an embodiment of the present invention, and FIG. 10 is a diagram showing a line state transition process according to an embodiment of the present invention.

First, referring to FIG. 2, a line fault detection system 100 collects communication alarms from a network infrastructure 200, and determines a line state. The line fault detection system 100 notifies information on the determined line state to a line management system 300. When the line state information indicates a line fault, the line management system 300 performs an optical loss measurement with an optical time domain reflectometer (OTDR) and determines whether a line fault occurred on the corresponding line. If it is determined that the line fault has occurred, the line management system 300 performs a failover. The line fault detection system 100 and the line management system 300 constitute a network control system managing a whole network.

Here, the line fault detection system 100 includes a system database 101, a network topology generator 103, a state vector generator 105, an alarm collector 107, and a state vector manager 109.

The system database 101 stores a network topology table and a line fault determination rule table.

The network topology generator 103 generates the network topology table based on information of network devices constituting the network infrastructure. The network topology table is as shown in Table 1 and Table 2, which are examples generated based on the network infrastructure shown in FIG. 3.

Referring to FIG. 3, central office A, central office B, subscriber C, and subscriber D are branch points of a communication network. Central office A and central office B, central office B and subscriber C, and station B and subscriber D are connected via at least one line. One central office or one subscriber is equipped with at least one network device. Therefore, a connection between central offices or a connection between a central office and a subscriber can be referred to as a connection between at least one network devices within the central office or the subscriber.

The central office A includes network devices $W_1$, $P_1$, and $M_1$, the central office B includes network devices $W_2$, $P_2$, and $M_2$, the subscriber C includes a network device $P_3$, and the subscriber D includes a network devices $M_3$.

$W_1$ of the central office A and $W_2$ of the central office B are connected via two lines oca100 and oca101 with different line IDs. $W_1$ of the central office A is connected to $P_1$ and $M_1$, and $W_2$ of the central office B is connected to $P_2$ and $M_2$. $P_1$ is connected to $P_2$ via $W_1$ and $W_2$, and $M_1$ is connected to $M_2$ via $W_1$ and $W_2$.

The central office B is connected to the subscriber C and the subscriber D, respectively. $P_2$ of the central office B is connected to $P_3$ of the subscriber C via two lines oca200 and oca201 with different line IDs. $M_2$ of the central office B is connected to $M_3$ of the subscriber D via two lines oca300 and oca301 with different line IDs.

At this time, each line may be included in the same conduit or may be included in different conduits.

A conduit is a facility that protects at least one line. For example, a synthetic resin pipe is buried to accommodate at least one line therein. The line may be referred to as a communication cable.

In this way, a line connecting the central office A and the central office B and a line connecting the central office B and the subscriber C or subscriber D may be at least one line, which may be formulated as Equation 1.

$$O_{a,z}=(A_1,A_2,\ldots,A_n) \quad \text{Equation 1}$$

Here, a and z are included in S. According to Equation 1, $O_{a,z}$ is a sequence of line ID($A_n$). Since the order in which the lines are connected is important, $O_{a,z}$ is expressed as a sequence. In $O_{a,z}$, a and z are elements of a set S representing an area where the corresponding network devices are set up. Since one line includes at least one core, each line set $A_x$ has a core ($c_{x,N}$) as an element, which is formulated as Equation 2.

$$A_x=\{c_{x,1},c_{x,2},\ldots,c_{x,n}\} \quad \text{Equation 2}$$

Table 1 shows a network topology of the central office A, and Table 2 shows a network topology of the central office B.

TABLE 1

Central Office A-Central Office B

| Node Name | Device Type | Device ID | Slot/Port ID | Line ID | Conduit ID |
|---|---|---|---|---|---|
| Central Office A | PTN | P1 | s1-p1 | oca100 | 1000 |
| Central Office A | PTN | P1 | s2-p1 | oca101 | 1001 |
| Central Office A | MSPP | M1 | s1-p1 | oca100 | 1000 |
| Central Office A | MSPP | M1 | s2-p1 | oca101 | 1001 |
| Central Office A | ROADM | W1 | s1-p1 | oca100 | 1000 |
| Central Office A | ROADM | W1 | s2-p1 | oca101 | 1001 |
| Central Office B | PTN | P2 | s1-p1 | oca100 | 1000 |
| Central Office B | PTN | P2 | s2-p1 | oca101 | 1001 |
| Central Office B | MSPP | M2 | s1-p1 | oca100 | 1000 |
| Central Office B | MSPP | M2 | s2-p1 | oca101 | 1001 |
| Central Office B | ROADM | W2 | s1-p1 | oca100 | 1000 |
| Central Office B | ROADM | W2 | s2-p1 | oca101 | 1001 |

TABLE 2

Central Office B - Subscriber C/Subscriber D

| Node name | Device type | Device ID | Slot/port ID | Line ID | Conduit ID |
|---|---|---|---|---|---|
| Central Office B | PTN | P2 | s5-p1 | oca200 | 2000 |
| Central Office B | PTN | P2 | s6-p1 | oca201 | 2001 |
| Central Office B | MSPP | M2 | s8-p1 | oca300 | 3000 |
| Central Office B | MSPP | M2 | s9-p1 | oca301 | 3001 |
| Subscriber C | PTN | P3 | s1-p1 | oca200 | 2000 |
| Subscriber C | PTN | P3 | s2-p1 | oca201 | 2001 |
| Subscriber D | MSPP | M3 | s1-p1 | oca300 | 3000 |
| Subscriber D | MSPP | M3 | s2-p1 | oca301 | 3001 |

According to Table 1 and Table 2, network devices are identified with site name, device type and system name. Connections between network devices are identified with slot/port, line ID, and channel ID. Here, a case where the line IDs are the same but the conduit IDs are different means that the lines are different.

The network topology generator 103 receives device information of the network infrastructure every day or at intervals predetermined by an operator, and updates the network topology based on the received device information.

The state vector generator 105 generates a network device vector for each node based on the network topology stored in the system database 101. Here, the network device vector has, as elements, the network devices included in each node connected to both ends of the line. In this network device vector, interconnected network devices via the line are set as elements at positions corresponding to each other. In the following description, since the element is set with a communication state of the network device, the network device vector will be collectively referred to as a state vector.

Here, the communication state is a communication state of network devices, which may be referred to as a connection state between a line and network devices.

At this time, according to an embodiment, the state vector has, as an element, the communication state of the network devices connected to the lines included in the same conduit.

Referring to FIG. 3, if oca100 and oca101 are included in the same conduit, one state vector for the central office A and the central office B is generated. On the other hand, if oca100 and oca101 are included in different conduits, two state vectors for the central office A and the central office B are generated.

According to another embodiment, the state vector has, as an element, the communication state of the network devices connected to each line. That is, a state vector for each of the lines defined in Equation 1 may be generated. Here, the slot/port described in Table 1 and Table 2 is set differently for each line.

According to another embodiment, each state vector for each core in a line defined by equation 2 may be generated as a state vector. In this case, the slot/port described in Table 1 and Table 2 is set differently for each core.

In an embodiment of the present invention, the state vector is generated for each line of different conduits.

Referring to FIG. 4, central office A and central office B are connected via oca100 and oca101 included in different conduits.

A state vector for oca100 is generated as a pair of a state vector $V_{1,1}$ for the central office A and a state vector $V_{1,2}$ for the central office B.

Referring to FIG. 3, there are three network devices $W_1$, $P_1$, and $M_1$ in the central office A. Thus, a state vector $V_{1,1}$ for the central office A includes an element $a_1$ representing a communication state of a port connected to oca100 of $W_1$, an element $a_2$ representing a communication state of a port connected to oca100 via $W_1$ of $P_1$, and an element $a_3$ representing a communication state of a port connected to oca100 via $W_1$ of $M_1$.

Since there are three network devices $W_2$, $P_2$, and $M_2$ in the central office B, a state vector $V_{1,2}$ for the central office B includes an element $b_1$ representing a communication state of a port connected to oca100 of $W_2$, an element $b_2$ representing a communication state of a port connected to oca100 via $W_2$ of $P_2$, and an element $b_3$ representing a communication state of a port connected to oca100 via $W_2$ of $M_2$.

As such, since the state vector $$V_{1,1}\begin{pmatrix}a_1\\a_2\\a_3\end{pmatrix} \text{ and } V_{1,2}\begin{pmatrix}b_1\\b_2\\b_3\end{pmatrix}$$

represent the connection state of the network devices facing each other, they make a pair with each other and an element in one state vector has one-to-one correspondence with an element in the other state vector at the same position. That is, $a_1$, $a_2$ and $a_3$ correspond to $b_1$, $b_2$, and $b_3$, respectively. State vectors for other lines are generated in the same way, which is described as follows.

For oca101, a state vector $V_{2,1}$ for the central office A and a state vector $V_{2,2}$ for the central office B are generated in pairs. The state vector $V_{2,1}$ for the central office A includes an element $c_1$ representing a communication state of a port connected to oca101 of $W_1$, an element $c_2$ representing a communication state of a port connected to oca101 via $W_1$ of $P_1$, and an element $b_3$ representing a communication state of a port connected to oca101 via $W_1$ of $M_1$.

The state vector $V_{2,2}$ for the central office B includes an element $d_1$ representing a communication state of a port connected to oca101 of $W_2$, an element $d_2$ representing a communication state of a port connected to oca101 via $W_2$ of $P_2$, and an element $d_3$ representing a communication state of a port connected to oca101 via $W_2$ of $M_2$.

The central office B and the subscriber C are connected via oca200 and oca201 included in different conduits, and the central office B and the subscriber D are connected via oca300 and oca301 included in different conduits.

For oca200, a state vector $V_{3,1}$ for the central office B and a state vector $V_{3,2}$ for the subscriber C are generated in pairs. The state vector $V_{3,1}$ for the central office B includes an element $e_1$ representing the communication state of a port connected to oca200 of $P_2$. The state vector $V_{3,2}$ for the subscriber C includes an element $f_1$ representing the communication state of a port connected to oca200 of $P_3$.

For oca201, a state vector $V_{4,1}$ for the central office B and a state vector $V_{4,1}$ for the subscriber C are generated in pairs. The state vector $V_{4,1}$ for the central office B includes an element gi representing the communication state of a port connected to oca201 of $P_2$. The state vector $V_{4,2}$ for the subscriber C includes an element $h_1$ representing the communication state of a port connected to oca201 of $P_3$.

For oca300, a state vector $V_{5,1}$ for the central office B and a state vector $V_{5,2}$ for the subscriber C are generated in pairs. The state vector $V_{5,1}$ for the central office B includes an element $i_1$ representing the communication state of a port connected to oca300 of $M_2$. The state vector $V_{5,2}$ for the subscriber C includes an element $j_1$ representing the communication state of a port connected to oca300 of $M_3$.

For oca301, a state vector $V_{6,1}$ for the central office B and a state vector $V_{6,2}$ for the subscriber C are generated in pairs. The state vector $V_{6,1}$ for the central office B includes an element $k_1$ representing the communication state of a port connected to oca301 of $M_2$. The state vector $V_{6,2}$ for the subscriber C includes an element $l_1$ representing the communication state of a port connected to oca301 of $M_3$.

In this way, if the generated state vector is expressed as Equation 3.

$$Vx,y \qquad \text{Equation 3}$$

Here, x is a line ID, and y belongs to {1, 2}.

Further, x is an ID representing a section of a line. Since y is a terminal point of the corresponding line, y has a value of 1 or 2.

The lines included in the same conduit are generated as one state vector, but a state vector for each line may be individually generated as described above in Equation 1 and Equation 2. That is, in FIG. 4, it is assumed that oca100 and oca101 are included in different conduits, but oca100 and oca101 may be included in the same conduit.

Additionally, a state vector may be generated for each core in the line.

Meanwhile, an element in the generated state vector represents a communication state of a port of a network device or a connection state of a port. For example, in the state vector $V_{1,1}$, the element $a_1$ represents the communication state of a port s1-p1 of the network device $W_1$ in the central office A.

The communication state of the port is expressed as 0 or 1. Here, 0 represents a normal state and 1 represents a fault state. When a state vector is generated, the state values of all the elements of the state vector are set to zero.

FIG. 5 shows a process of generating a state vector in a state vector generator 105.

Referring to FIG. 5, the state vector generator 105 receives an input of a network topology stored in a system database 101 (S101).

If a line ID and a conduit ID are the same, it can be said that two central office are adjacent to each other in the network topology.

In order to check whether the central offices are adjacent to each other, the state vector generator 105 determines whether central office information included in the network topology received at step S101 exists as a central office node of the previously generated state vector (S103).

For example, the first line of Table 1 is input and then the central office A generates a node corresponding to the central office A because the input is made for the first time. Thereafter, when the first line of Table 2 is input, since nodes for the central office A and the central office B have been already generated through Table 1, there is no need to generate a new node.

When a node does not exist, a central office node corresponding to the central office information included in the input network topology is generated (S105).

If it is determined that the central office node exists at step S103 or after the central office node is generated at step S105, the state vector generator 105 determines whether there is a previously generated state vector of a conduit connected to the central office node (S107). Referring to FIG. 3, the central office A and the central office B are connected via oca100 and oca101. At this time, if oca100 and oca101 are included in the same conduit, one state vector is generated for the central office A and the central office B, but if they are included in different conduits, two state vectors are generated for the central office A and the central office B.

If it is determined that a state vector of a conduit connected to the central office node does not exist in step S107, a state vector having ID of the conduit connected to the central office as a key value is generated (S109).

If it is determined that the state vector of the conduit connected to the central office node exists in step S107, or if the state vector is generated in step S109, an element indicating a communication state of the central office node is added to the state vector (S111).

The above-described steps (S101 to S111) may be implemented with codes. An example of the code for defining a central office and state vector element class may be described as the following table.

First, a code for defining a central office class is as shown in Table 3.

TABLE 3

```
//define class of central office
class Node {
    public String siteName; //name of central office
    public HashMap<String, List<Edge>> neighbors = new HashMap<String,
```

TABLE 3-continued

```
List<Edge>>( ); //generate vetcor having conduit ID as key and information of cable
passing through conduit as Value
    public Node( ) {
    }
    public Node(String x) {
        this.siteName = x;
    }
}
```

A code for defining a vector element class containing line information is as shown in FIG. 6.

In addition, examples of a code for generating and adding a node and an element of a state vector is as shown in the following Table 4, Table 5, Table 6, Table 7, Table 8, and Table 9.

TABLE 4

```
List<String> lines = new ArrayList<String>( );//store name of central office for which
node has been generated up to now
// if node corresponding to central node does not exist, generate a node
//if node exists, call the corresponding node
if(!lines.contains(siteA)) {
        lines.add(siteA);
        node1 = new Node(siteA);
}
else {
        Iterator it = g.nodes.iterator( );
        while(it.hasNext( )) {
            temp1 = (Node) it.next( );
            if(temp1.siteName.equals(siteA)) {
                node1 = temp1;
                break;
            }
        }
}
if(!lines.contains(siteZ)) {
        lines.add(siteZ);
        node2 = new Node(siteZ);
}
else {
        Iterator it = g.nodes.iterator( );
        while(it.hasNext( )) {
            temp2 = (Node) it.next( );
            if(temp2.siteName.equals(siteZ)) {
                node2 = temp2;
                break;
            }
        }
}
```

TABLE 5

Vector vector1 = new Vector(siteA, siteZ); //generate elements of vector vector1.setSystem(A system name, Z system name); //add system name to elements of the corresponding vector vector1.setSysPort(Aslot/port, Zslot/port); //add slot/port information to the element of the corresponding vector vector1.setCableID(CableID); //add corresponding Cable ID information Vector vector2 = new Vector(siteZ, siteA);

vector1.setSystem(A system name, Z system name);

vector2.setSysPort(Zslot/port, Aslot/port);

vector2.setCableID(CableID);

TABLE 6

```
//add information on elements of the corresponding vector
    vector1.opposit = vector2;
    vector2.opposit = vector1;
```

TABLE 7

```
//check whether there is a vector with corresponding conduit ID in each central office
Boolean conduit1 = node1.neighbors.containsKey("conduit ID");
Boolean conduit2 = node2.neighbors.containsKey("conduit ID");
```

TABLE 8

```
//if corresponding conduit ID vector exists in central office A, add an element to existing
vector,
if not, generate a vector and add an element to the vector
if(conduit1) {
    ArrayList<Edge> edges1 = node1.neighbors.get("conduit ID");
    edges1.add(edge1);
    node1.neighbors.replace("conduit ID", edges1);
}
else {
    ArrayList<Edge> edges1 = new ArrayList<Edge>( );
    edges1.add(edge1);
node1.neighbors.put("conduit ID", edges1);
}
```

TABLE 9

```
//if corresponding conduit ID vector exists in central office Z, add an element to existing
vector; if not, generate a vector and add an element to the vector
if(conduit2) {
    ArrayList<Edge> edges2 = node2.neighbors.get("conduit ID");
    edges2.add(edge2);
    node2.neighbors.replace("conduit ID", edges2);
}
else {
    ArrayList<Edge> edges2 = new ArrayList<Edge>( );
    Edges2.add(edge2);
    node2.neighbors.put("conduit ID", edges2);
}
```

The alarm collector 107 collects communication alarms from the network infrastructure 300 and outputs them to the state vector manager 109. The communication alarm may be a line fault alarm (e.g., LOS), a line fault recovery alarm (e.g., Clear), and the like. Here, the alarm collector 107 may collect alarms generated from the network infrastructure 300 by intervals predetermined by the operator or in real-time.

The alarm collector 107 may collect alarms in the format as shown in FIG. 7.

Referring to FIG. 7, a communication alarm 400 includes the items of equipment 401, port 403, fault alarm 405, and occurrence time 407.

When a fault alarm occurs, the state vector manager 109 sets an element corresponding to a network device in which the fault alarm has occurred among the elements of the state vector for each node as a communication state according to the fault alarm.

Referring to FIG. 8, when a communication alarm is transmitted from the alarm collector 107 (S201), the state vector manager 109 identifies a network device where which the communication alarm occurred and a line to which the network device is connected (S203).

The state vector manager 109 changes the communication state of the network device in the state vector of the identified line (S205). That is, the state value predetermined as 0 is changed to 1.

At this time, the state vector manager 109 may identify the equipment type of network devices in the network infrastructure based on the network topology tables shown in Table 1 and Table 2. In addition, the state vector manager 109 changes the state value based on the format of line fault alarm for each equipment type stored in the system database 101. Table 10 shows the formats of line fault alarms for each equipment type, which are stored in the line fault determination rule in the system database 101.

TABLE 10

| Equipment Type | Line fault alarm format (symbol) |
| --- | --- |
| PTN | Loss of Signal |
| ROADM | OSC_LOS |
| MSPP | LOS |
| CWDM | LOS |
| ROUTER | Link Shutdown |
| SWITCH | Link Down |

For example, the state vector manager 109 identifies that LOS in the first line of the communication alarm shown in FIG. 7 corresponds to the MSPP in Table 3. The state vector manager 109 changes the communication state value of MSPP from 0 to 1, in the state vector of the line connected to slot1/port5 among state vectors generated by the state vector generator 105.

The state vector manager 109 performs an operation of determining the line state when the state vector is updated according to the communication alarm or a predetermined interval arrives. This operation of determining the line state is as shown in FIG. 9.

Referring to FIG. 9, the state vector manager 109 receives a state vector pair for each line, for example ($V_{a,1}$, $V_{a,2}$), from the state vector generator 105 (S301). In the state vector pair, the communication states of each network device with the same type of equipment connected to both ends of the line correspond to each other.

The state vector manager 109 performs a logical sum (OR) operation between the state vectors $V_{a,1}$ and $V_{a,2}$ received in step S301 (S303). The OR operation between $V_{a,1}$ and $V_{a,2}$ may be expressed as follows with reference to FIG. 4.

$$v_{1,1} \oplus v_{1,2} = \begin{pmatrix} a_1 \\ a_2 \\ a_3 \end{pmatrix} \oplus \begin{pmatrix} b_1 \\ b_2 \\ b_3 \end{pmatrix} = v_{result} = \begin{pmatrix} a_1 \oplus b_1 \\ a_2 \oplus b_2 \\ a_3 \oplus b_3 \end{pmatrix} \quad \text{Equation 4}$$

The state vector manager 109 determines whether all the elements constituting a result vector $V_{result}$ derived through the OR operation in step S303 (that is, the state values of $a_1 \oplus b_1$, $a_2 \oplus b_2$, $a_3 \oplus b_3$) are 0 (S305).

If all elements are determined to be 0, the state vector manager 109 determines the state of the corresponding line as a normal state (S307).

If not all of the elements are determined to be 0, the state vector manager 109 determines whether all elements are 1 (S309). If not all of the elements are determined to be 1, the state vector manager 109 determines whether an element with a state value of the result vector of 1 is network equipment directly connected to the line (S311).

When all elements are determined to be 1 in step S309 or the element with a state value of the result vector of 1 is determined to be the network equipment directly connected to the line, the state vector manager 109 determines the state of the corresponding line as a fault state (S313).

In addition, in step S311, if it is determined that the element with a state value of the result vector of 1 is not the network equipment directly connected to the line, it is determined whether the number of elements with the state value of the result vector of 1 is greater than or equal to a threshold value (S315). At this time, if the number of elements is determined to be less than the threshold value, the process returns to step S301. Meanwhile, if the number of elements is determined to be greater than or equal to the threshold value, the state of the corresponding line is determined as a partial fault state (S317). For example, it is assumed that the number of elements in the state vector is 10 and the threshold value is 80%. At this time, if the number of elements having a state value of 1 is greater than or equal to 8, the state of the corresponding line is determined to be the partial fault state.

The state vector manager 109 determines the state of the line through the above-described processes (S301 to S317), and the state of the line passes through state transition process as shown in FIG. 10.

Referring to FIG. 10, the state of the line is classified into an initial state, a normal state, a partial fault state, a fault state, and an end state. At this time, the state of each line is determined through the process shown in FIG. 9.

When a system is initialized or a state vector is generated, the line state of the state vector is in the initial state. After the state vector is generated, the line state of the state vector transitions from the initial state to the normal state (①).

After that, when the state value of the state vector is updated from normal state upon occurrence of the communication alarm, the line state transitions from the normal state to the fault state (②), the partial fault state (③), or the end state (④). When the communication alarm is a fault alarm and all of the updated state values are changed to 1, the line state transitions from the normal state to the fault state (②). When some of the updated state values are changed to 1, the line state transitions from the normal status to the partial fault state (③). When the communication alarm is a communication end alarm, the line state transitions from the normal state to the end state (④).

In addition, when a fault recovery alarm occurs in the fault state and all the state values of the state vectors are updated to 0, the line state transitions from the fault state to the normal state (⑤). And, when some of the state values of the state vector is updated to 0, the line state transitions from the fault state to the partial fault state (⑥). When the communication end alarm occurs in the fault state, the line state transitions from the fault state to the end state (⑦).

In addition, when a fault recovery alarm occurs in the partial fault state and all the state values of the state vector are updated to 0, the line state transitions from the partial fault state to the normal state (⑧). And, when all the state values are updated to 1, the line state transitions from the partial fault state to the fault state (⑨). When the communication end alarm occurs in the partial fault state, the line state transitions from the partial fault state to the end state (⑩).

In addition, when the communication end alarm for all state vectors occurs in the end state, the line state enters into the initial state (⑪).

Based on the above description, an embodiment of generating and changing a state vector representing a line state for a network infrastructure, and determining and transitioning the line state based on the state values of the state vector will be described.

Figure 11:
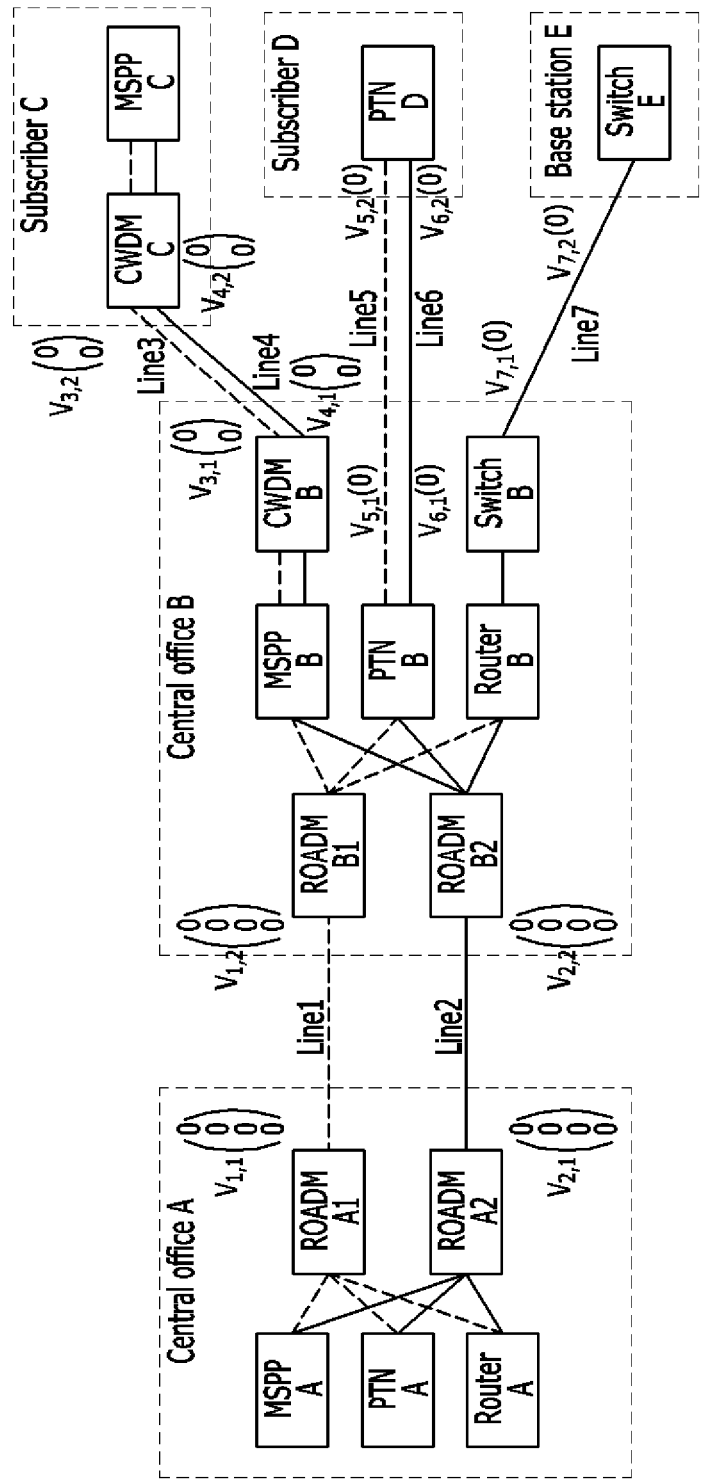
FIG. 11 is an example diagram showing an initial state of a line state according to an embodiment of the present invention.
Figure 12:
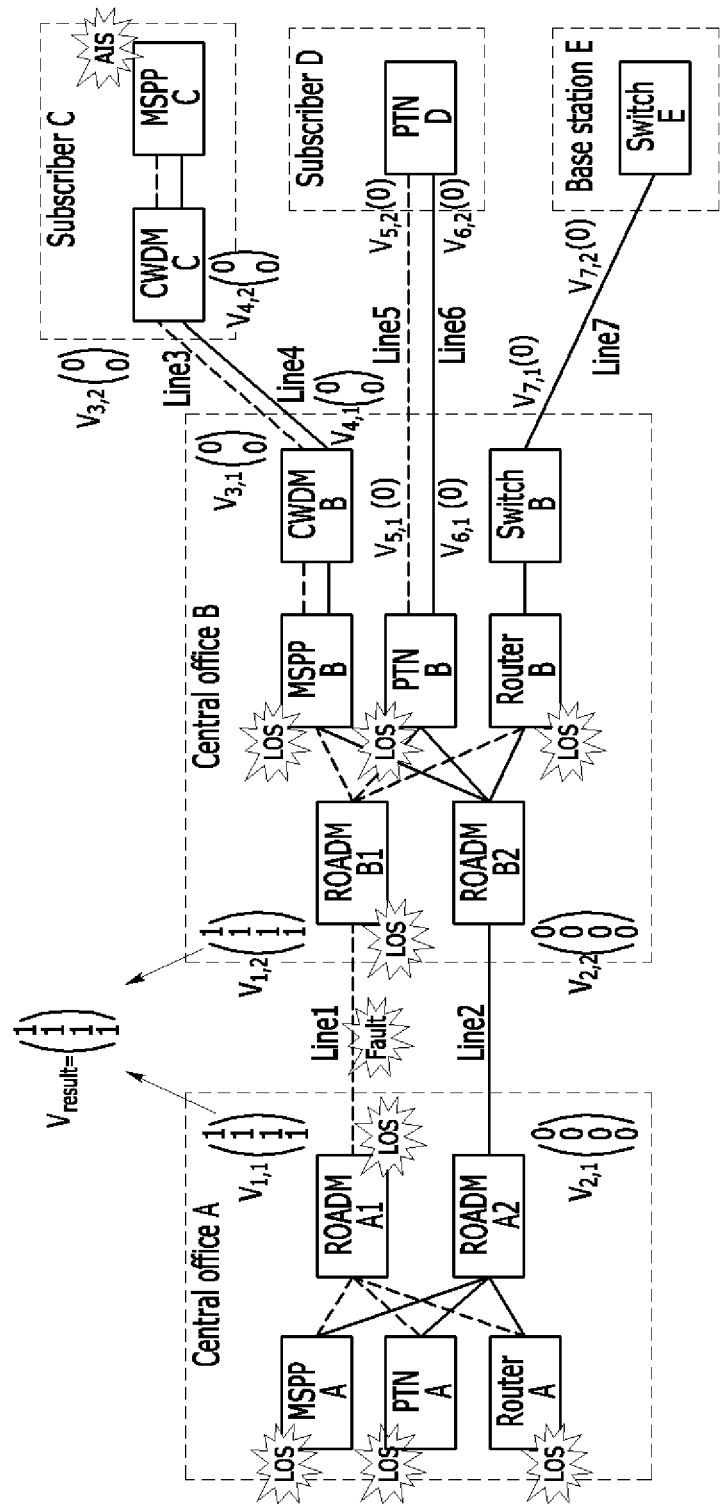
FIG. 12 is an example diagram showing a fault state of line 1 according to an embodiment of the present invention.
Figure 13:
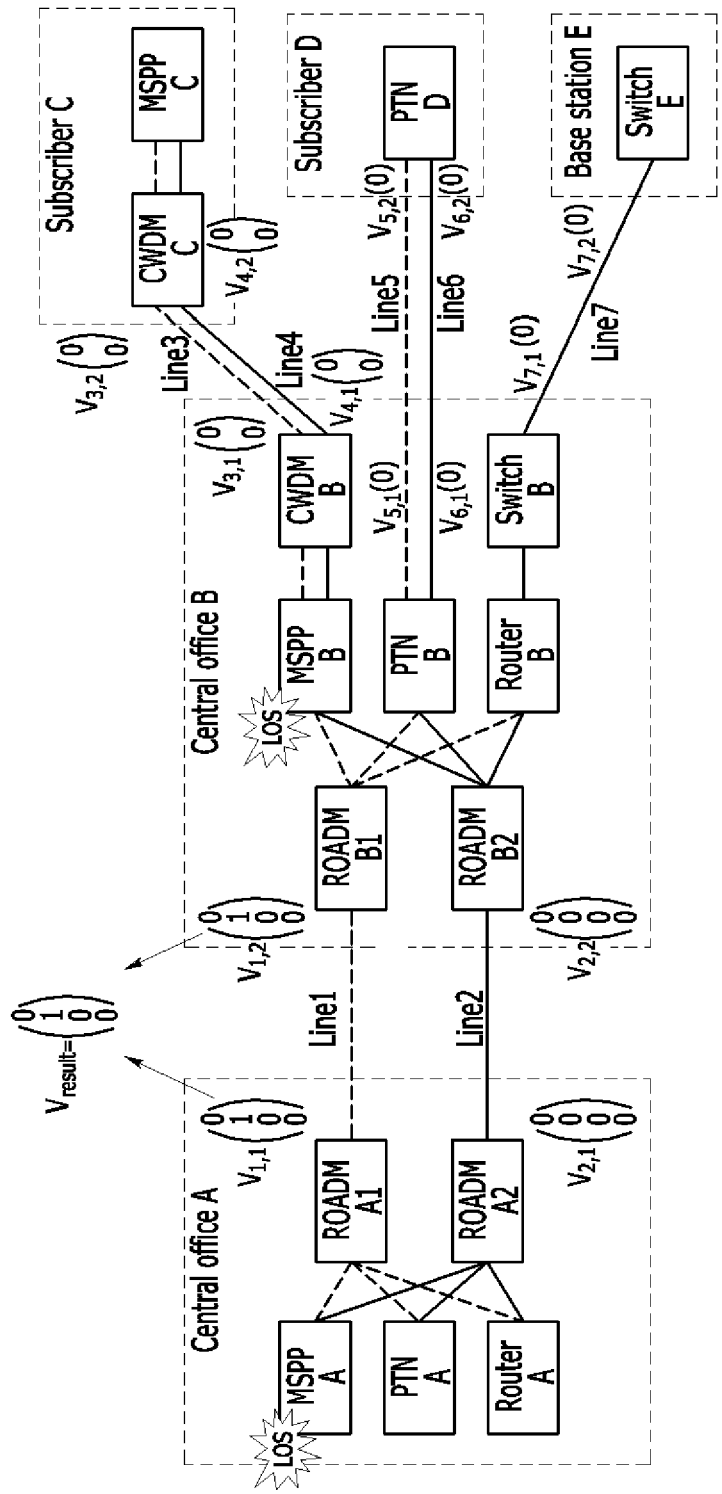
FIG. 13 is an example diagram showing a partial fault state of line 1 according to an embodiment of the present invention.

FIG. 11 is an example diagram showing an initial state of a line state according to an embodiment of the present invention, FIG. 12 is an example diagram showing a fault state of line 1 according to an embodiment of the present invention, and FIG. 13 is an example diagram showing a partial fault state of line 1 according to an embodiment of the present invention.

Referring to FIG. 11, central office A and central office B are connected via line 1 and line 2, respectively. The central office B is connected to subscriber C via line 3 and line 4, respectively. The central office B is connected to the subscriber D via line 5 and line 6, respectively. The central office B is connected to base station E via line 7. Here, the central office, the subscriber, and the base station refer to the terminal points of the line.

At this time, since one state vector is generated for communication lines included in the same conduit in an embodiment of the present invention, it is premised that the communication lines are included in different conduits.

One end of line 1 is connected to ROADM A1 of the central office A, and the other end of line 1 is connected to ROADM B1 of the central office B. A multiservice switching platform (MSPP) A is connected to line 1 via ROADM A1. PTN A is connected to line 1 via ROADM A1. Router A is connected to line 1 via ROADM A1. MSPP B is connected to line 1 via ROADM B1. PTN B is connected to line 1 via ROADM B1. Router B is connected to line 1 via ROADM B1.

The state vector $V_{1,1}$ of the central office A for line 1 includes an element representing the state of a port connecting ROADM A1 to line 1, an element representing the state of a port connecting MSPP A to ROADM A1, an element representing the state of a port connecting PTN A to ROADM A1, and an element representing the state of a port connecting router A to ROADM A1. Here, since MSPP A, PTN A, and Router A are connected to line 1 via ROADM A1, the state of the port connected to ROADM A1 can be said to be the state of the port connected to line 1.

The state vector $V_{1,2}$ of the central office B for line 1 includes an element representing the state of a port connecting ROADM B1 to line 1, an element representing the state of a port connecting MSPP B to ROADM B1, an element representing the state of a port connecting PTN B to ROADM B1, and an element representing the state of the port connecting router B to ROADM B1. Here, since MSPP B, PTN B, and router B are connected to Line 1 via ROADM B1, the state of the port connected to ROADM B1 can be referred to be the state of the port connected to line 1.

At this time, since it is in an initial state, the state values of each element constituting each of the state vectors $V_{1,1}$ and $V_{1,2}$ for the central office A and the central office B are set to 0.

One end of line 2 is connected to ROADM A2 of the central office A and the other end of line 2 is connected to ROADM B2 of central office B. MSPP A is connected to line 2 via ROADM A2. PTN A is connected to line 2 via ROADM A2. Router A is connected to line 2 via ROADM A2. MSPP B is connected to line 2 via ROADM B2. PTN B is connected to line 2 via ROADM B2. Router B is connected to line 2 via ROADM B2.

The state vector $V_{2,1}$ of the central office A for line 2 includes an element representing the state of a port connecting ROADM A2 to line 2, an element representing the state of a port connecting MSPP A to ROADM A2, an element representing the state of a port connecting PTN A to ROADM A2, and an element representing the state of the port connecting router A to ROADM A2. Here, since MSPP A, PTN A, and router A are connected to line 2 via ROADM A2, the state of the port connected to ROADM A2 can be understood to be the state of the port connected to line 2.

The state vector $V_{2,2}$ of the central office B for line 2 includes an element representing the state of a port connecting ROADM B2 to line 2, an element representing the state of a port connecting MSPP B to ROADM B2, an element representing the state of a port connecting PTN B to ROADM B2, and an element representing the state of the port connecting router B to ROADM B2. Here, since MSPP B, PTN B, and router B are connected to line 2 via ROADM B2, the state of the port connected to ROADM B2 can be understood to be the state of the port connected to line 2.

At this time, since it is in an initial state, the state values of each element constituting each of the state vectors $V_{2,1}$, and $V_{2,2}$ for the central office A and the central office B are set to 0.

One ends of line 3 and line 4 are connected to coarse wavelength division multiplexing (CWDM) B of the central office B, respectively, and the other ends of line 3 and line 4 are connected to CWDM C of the subscriber C, respectively. Here, CWDM B is connected to MSPP B, and CWDM C is connected to MSPP C.

CWDM B and CWDM C are connected to line 3 and line 4 using different ports, respectively. The state vector $V_{3,1}$ of the central office B for line 3 includes an element representing the state of the port connecting CWDM B to line 3, and an element representing the state of the port connecting MSPP B to line 3 via CWDM B. The state vector $V_{3,2}$ of subscriber C for line 3 includes an element representing the state of the port connecting CWDM C to line 3, and an element representing the state of the port connecting MSPP C to line 3 via CWDM C.

The state vector $V_{4,1}$ of the central office B for line 4 includes an element representing the state of the port connecting CWDM B to line 4, and an element representing the state of the port connecting MSPP B to line 4 via CWDM B. The state vector $V_{4,2}$ of subscriber C for line 4 includes an element representing the state of the port connecting CWDM C to line 4, and an element representing the state of the port connecting MSPP C to line 4 via CWDM C.

At this time, since it is in an initial state, the state values of each element constituting each of the state vectors $V_{4,1}$, and $V_{4,2}$ for the central office B and the subscriber C are set to 0.

PTN B and PTN D are connected to line 5 and line 6, respectively, using different ports. One ends of line 5 and line 6 is connected to PTN B and the other ends of line 5 and line 6 is connected to PTN D, respectively. The state vector $V_{5,1}$ of the central office B for line 5 includes an element representing the state of the port connecting PTN B to line 5 and the state vector $V_{5,2}$ of the subscriber D for line 5 includes an element representing the state of the port connecting PTN D to line 5. The state vector $V_{6,1}$ of the central office B for line 6 includes an element representing the state of the port connecting PTN B to line 6 and the state vector $V_{6,2}$ of the subscriber D for line 6 includes an element representing the state of the port connecting PTN D to line 6. At this time, since it is in an initial state, the state values of each element constituting each of the state vectors $V_{5,1}$, $V_{5,2}$, $V_{6,1}$ and $V_{6,2}$ for the central office B and the subscriber D are set to 0.

One end of line 7 is connected to switch B of the central office B, and the other end of line 7 is connected to switch E of base station E. The state vector $V_{7,1}$ of the central office B for line 7 includes an element representing the state of the port connecting switch B to line 7 and the state vector $V_{7,2}$ of the base station E includes an element representing the state of the port connecting switch E to line 7. At this time, since it is in an initial state, the state values of each element constituting each of the state vectors $V_{7,1}$ and $V_{7,2}$ for the central office B and the subscriber E are set to 0.

That is, since all of the state values of elements constituting state vectors of each of the central office A, the central office B, subscriber C, subscriber D, and the base station E for all the lines are 0, the lines are in normal state.

At this time, as shown in FIG. 12, when a line fault that the line 1 is broken occurs, a fault alarm such as loss of signal (LOS) occurs in the ports of each network devices (that is, ROADM A1, MSPP A, PTN A, Router A, ROADM B1, MSPP B, PTN B, Router B) connected to line 1. This fault alarm means that signals cannot be received from the network devices connected to line 1. Further, a communication alarm such as alarm indication signal (AIS) is generated in MSPP C of subscriber C.

When the communication alarm is received, the state vector manager (109 shown in FIG. 2) changes the state value of an element corresponding to the network device among the elements of the state vectors $V_{1,1}$, and $V_{1,2}$ of line 1 to which the network devices where the communication alarm is generated are connected. At this time, since the received alarm is a fault alarm, the state value is changed from 0 to 1.

Although a communication alarm occurs in MSPP C of subscriber C, as described above with reference to Table 3, a state transition in an embodiment of the present invention is based on a fault alarm. Thus, the state vectors of line 3 and line 4 connected to MSPP C of subscriber C are not changed.

The state vector manager 109 changes the state vectors $V_{1,1}$, and $V_{1,2}$ of line 1, and then performs an OR operation on paired state vectors for each line.

Here, the operation between state vectors of line 1 is expressed as an equation as follows.

$$V_{result} = V_{1,1} \oplus V_{1,2} = \begin{pmatrix}1\\1\\1\\1\end{pmatrix} \oplus \begin{pmatrix}1\\1\\1\\1\end{pmatrix} = \begin{pmatrix}1\\1\\1\\1\end{pmatrix} \quad \text{Equation 5}$$

As such, since all the elements of the state vectors $V_{1,1}$ and $V_{1,2}$ of line 1 are changed to 1, all the stated values of the result vector $V_{result}$ derived as a result of the OR operation between the state vectors $V_{1,1}$ and $V_{1,2}$ are 1. Thus, the state of line 1 transitions from the normal state to the fault state.

However, all the state vectors for line 2, line 3, line 4, line 5, line 6, and line 7 have not been changed. Among these, an operation between the state vectors of line 2 is expressed as following Equation 6.

$$V_{result} = V_{1,3} \oplus V_{2,2} = \begin{pmatrix}0\\0\\0\\0\end{pmatrix} \oplus \begin{pmatrix}0\\0\\0\\0\end{pmatrix} = \begin{pmatrix}0\\0\\0\\0\end{pmatrix} \quad \text{Equation 6}$$

In this way, since all of the state values of the state vectors $V_{2,1}$ and $V_{2,2}$ for line 2 are 0, all the state values of the result vector $V_{result}$ derived as a result of the OR operation between the state vectors $V_{2,1}$ and $V_{2,2}$ are 0. Therefore, the state of line 2 remains in the normal state. This is the same for line 3, line 4, line 5, line 6, and line 7.

Therefore, it is possible to identify a line and a network device in which a fault has occurred through the state values of the elements constituting the state vector of each line.

However, conventional techniques use only an alarm of the network device at the system level. In the conventional techniques, referring to only the central office A, the LOS alarm is generated due to a line fault on ROADM A1, but fault alarms such as LOS and link down are generated in all of MSPP A, PTN, A, and Router A. Thus, it is misinterpreted that faults have occurred in all lines to which MSPP A, PTN A, and Router A are connected.

In other words, according to the alarm signal propagation system of the network technology, fault alarms are generated in all of MSPP A/B/C, PTN A/B, and Router A/B that are not directly connected to line 1. Thus, in the case where the fault alarm is generated due to a fault on line 1 between the equipments of ROADM A1 and ROADM B1, it cannot be determined whether the fault occurred only on line 1 or even on line 2 at the system level. In addition, since the fault alarm occurs even at subscriber C, it is difficult for the network operator to know immediately whether the fault alarm is due to a fault on line 1. Therefore, the operator had to visit the site and perform network fault analysis.

However, in an embodiment of the present invention, a line and a network device where a fault occurred can be easily identified on-line through the state values of the result vector derived by OR operation on each state vector for the lines.

In addition, fault alarms as shown in Table 11 may occur, which will be described with reference to FIG. 13.

TABLE 11

| Equipment | port | Fault alarm | Occurrence time |
|---|---|---|---|
| MSPP A | slot1/port5 | Loss of Signal(LOS) | 2016/1/1 20:13:01 |
| MAPP B | slot6/port10 | Loss of Signal(LOS) | 2016/1/1 20:13:01 |

Table 11 shows an MSPP fault alarm that may correspond to a case where connecting units of MSPP A and MSPP B have some trouble. Alternatively, when both a line connecting MSPP A to ROADM A1 and a line connecting MSPP B with ROADM B1 are broken, the MSPP fault alarm may be generated.

Referring to FIG. 13, since fault alarms for MSPP A and MSPP B are generated respectively, a state vector manager 109 changes the state value of the element corresponding to MSPP A from 0 to 1, among the elements of the state vector $V_{1,1}$ for the central office A of line 1. Then, among the elements of the state vector $V_{1,2}$ for the central office B of line 1, a state vector manager 109 changes the state value of the element corresponding to MSPP B from 0 to 1.

After changing the state vectors $V_{1,1}$ and $V_{1,2}$, the state vector manager 109 performs an OR operation on the paired state vectors $V_{1,1}$ and $V_{1,2}$ for each line. This may be described as in Equation 7.

$$V_{result} = V_{1,1} \oplus V_{1,2} = \begin{pmatrix}0\\1\\0\\0\end{pmatrix} \oplus \begin{pmatrix}0\\1\\0\\0\end{pmatrix} = \begin{pmatrix}0\\1\\0\\0\end{pmatrix} \quad \text{Equation 7}$$

Here, since some elements of the state vectors $V_{1,1}$ and $V_{1,2}$ for line 1 are changed to 1, some elements of a result vector $V_{result}$ derived as a result of the OR operation between the state vectors also have the state values of 1. Thus, the state of line 1 transitions from a normal state to a partial fault state.

However, since all the state vectors for line 2, line 3, line 4, line 5, line 6, and line 7 are not changed, each result vector derived as an OR operation result between the state vectors has all the state values of 0. As a result, each state of line 2, line 3, line 4, line 5, line 6, and line 7 remains in the normal state.

When determining a fault at the conventional system level, the fault alarm occurs in both MSPP A and MSPP B even though the fault alarm is generated due to a line fault between MSPP A and ROADM 1 or equipment failure in MSPP A. Therefore, an error of recognizing that a problem occurs also in line 1 connecting MSPP A with MSPP B, and the line between MSPP B and ROADM B1 may occur. However, in an embodiment of the present invention, since all the state values of the result vector $V_{result}$ for line 1 are not 1, it can be determined that line 1 is not in a complete fault state and a partial fault with being troubled in the network device connected to line 1 has occurred.

Alternatively, in a case where a threshold value of the result vector $V_{result}$ for line 1 is predetermined as 80%, when the number of elements representing the fault state in the result vector $V_{result}$ is 1 (that is, 25%), it can be determined to be less than the threshold value. Accordingly, in this case, the state vector manager 109 can maintain the normal state without determining the line state as a fault state even if the state value of the state vector has been changed.

As described above, when the line state is determined, the state vector manager 109 outputs information on the determined line state to a control terminal (not shown) of an operator or to a line management system 300. Then, the line management system 300 performs line management based on the line state information. Hereinafter, the line management operation will be described with reference to FIG. 14.

Figure 14:
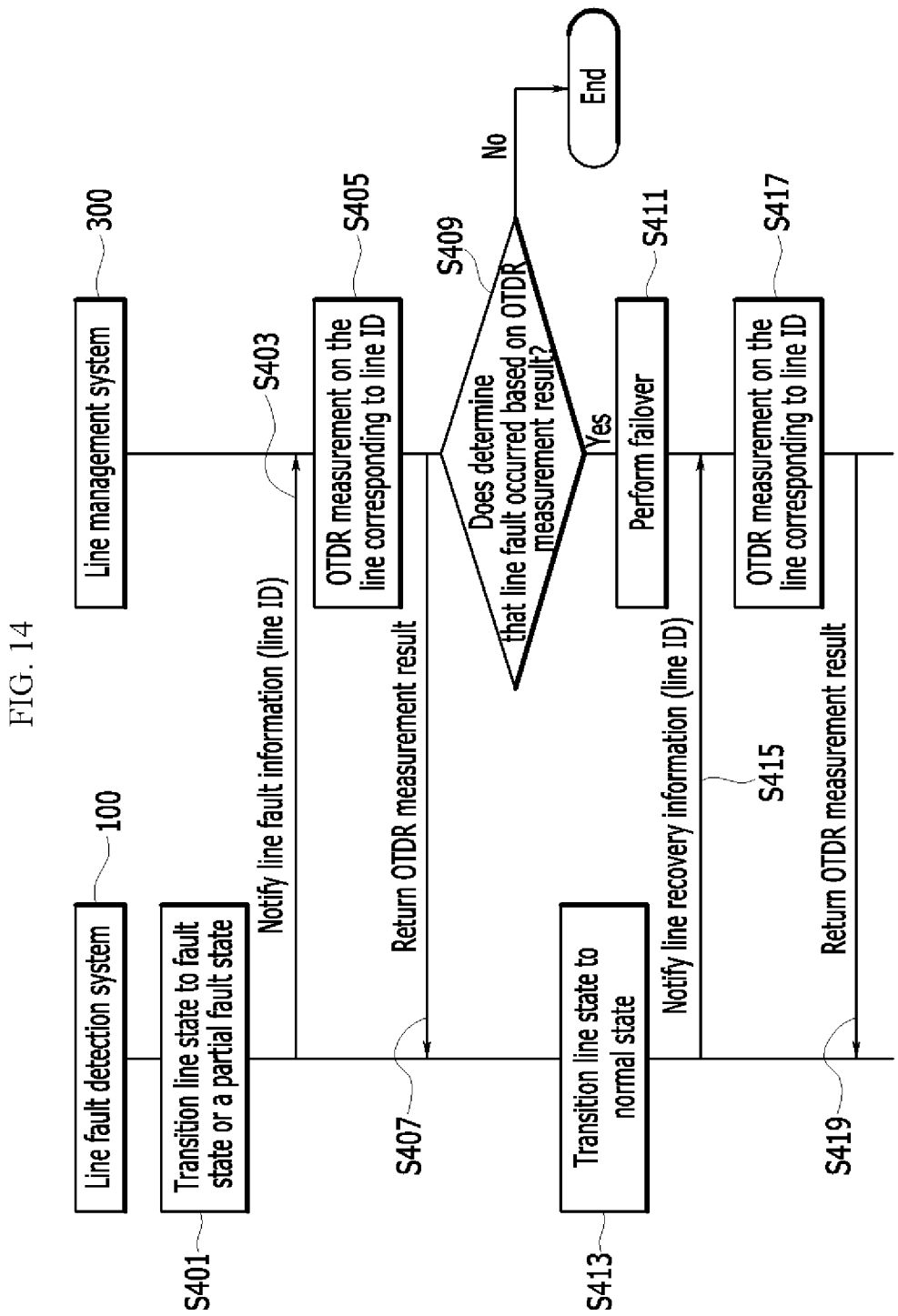
FIG. 14 is a flowchart showing a line management operation according to an embodiment of the present invention.

FIG. 14 is a flowchart showing a line management operation according to an embodiment of the present invention.

Referring to FIG. 14, when a line state transitions to a fault state or a partial fault state (S401), a line fault detection system 100 notifies line fault information to a line management system 300 (S403). The line fault information includes ID of the line whose line state has been changed to the fault state.

The line management system 300 performs optical loss measurement (OTDR) on the line corresponding to the line ID identified from the line fault information notified in step S403 (S405).

The line management system 300 transmits an optical loss measurement result to the line fault detection system 100 (S407). At this time, the optical loss measurement result includes whether or not a fault has occurred on a line determined based on the optical loss measurement value, an ID of a central office being a target of optical loss measurement, a point at which the fault is measured when it is determined that a fault has occurred, and an adjacent central office ID adjacent to the measurement target central office.

The line management system 300 determines whether the line fault has occurred based on the optical loss measurement result (S409). At this time, if it is determined that the line fault has occurred, the line management system 300 performs failover (S411). Here, the failover may include an operation of modifying a parameter of a network device or a line in a remote place. The failover may further include an operation of sending a failover instruction to a terminal (not shown) of an administrator who needs to go to the site where the line section is positioned and take an actual failover.

Thereafter, when the line state transitions to a normal state (S413), the line fault detection system 100 notifies line recovery information to the line management system 300 (S415).

The line management system 300 performs optical loss measurement (OTDR) on the line corresponding to the line ID identified from the line recovery information notified in step S415 (S417).

The line management system 300 transmits an optical loss measurement (OTDR) result to the line fault detection system 100 (S419). At this time, if the optical loss measurement (OTDR) result indicates line recovery, the line recovery information is reflected.

As described above, in an embodiment of the present invention, the line fault detection system 100 may generate a state vector representing a line for each line state based on the information on interconnection among network devices, may change the state values of the state vector based on the communication alarm, and then may detect a line section where the state is changed through performing operation between the state vectors.

Figure 15:
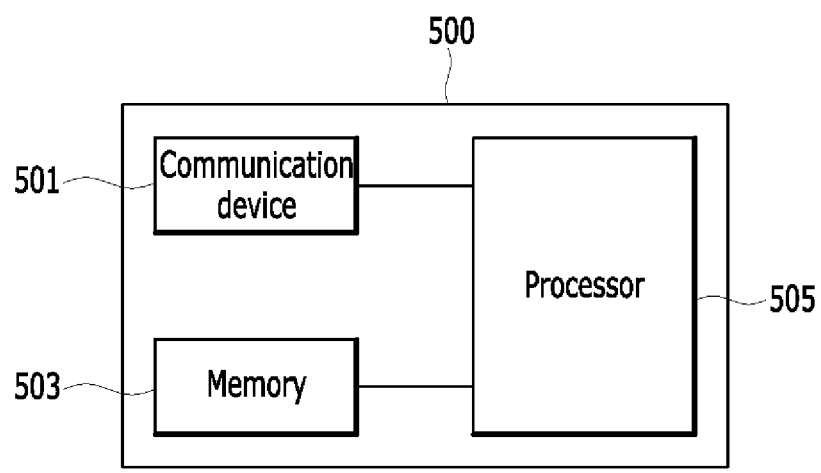
FIG. 15 is a hardware block diagram of a line fault detection device according to an embodiment of the present invention.

Meanwhile, FIG. 15 is a hardware block diagram of a line fault detection apparatus according to an embodiment of the present invention, and shows a hardware configuration of the line fault detection apparatus 500 described in FIG. 1 to FIG. 14.

Referring to FIG. 15, the line fault detection apparatus 500 includes a communication device 501, a memory 503, and at least one processor 505. The communication device 501 is connected to at least one processor 505, and transmits and receives data. The memory 503 is connected to at least one processor 505 and stores a program including instructions for executing a configuration and/or method according to embodiments described with reference to FIG. 1 to FIG. 14. The program implements the present invention through combining hardware such as the memory 503 and at least one processor 505.

Although the examples of the present invention have been described in detail above, the scope of the present invention is not limited thereto, and various modifications and improvements by those skilled in the art using the basic concept of the present invention defined in the following claims are also provided. It belongs to the scope of rights.

The invention claimed:

1. A line fault detection method of a line fault detection system operated by at least one processor, the method comprising:
    generating a network device vector for each node, whose elements are network devices included in each node connected to both ends of a line;
    when a fault alarm occurs, setting an element corresponding to the network device in which the fault alarm occurs among the elements of the network device vector as a communication state according to the fault alarm; and
    determining whether a fault occurred in the line based on a result of a logical operation of a pair of network device vectors corresponding to the line, and determining the network device where the fault occurred based on the communication state set in the network device vector.

2. The method of claim 1, wherein the generating of the network device vector comprises:
    generating a first network device vector having as an element at least one first network device belonging to a first node connected to one end of the line; and
    generating a second network device vector that has, as an element, at least one second network device connected to each of the at least one first network device and belonging to a second node connected to the other end of the line, wherein the setting of the element comprises:
    setting an element of the first network device in which the fault alarm occurred, among the elements of the first network device vector, as the communication state according to the fault alarm; and
    setting an element of the second network device in which the fault alarm occurred, among the elements of the second network device vector, as the communication state according to the fault alarm.

3. The method of claim 2, wherein the determining of whether the fault occurred comprises:
    performing a logical sum (OR) operation between elements of the first network device vector and the second network device vector; and determining a state of the line by using a communication state of each element of a result vector derived through the OR operation.

4. The method of claim 3, wherein the determining of whether the fault occurred comprises:
   determining the state of the line as a fault state, when the communication state of all elements of the result vector represents a fault state or when the communication state of an element indicating a network device directly connected to the line, among the elements of the result vector, represents a fault state.

5. The method of claim 4, wherein the determining of whether the fault occurred comprises:
   determining the state of the line as a partial fault state, when the number of elements representing that the communication state is in the fault state, among the elements of the result vector, is greater than or equal to a threshold value.

6. The method of claim 1, further comprising:
   prior to generating the network device vector, generating topology information including interconnected node IDs, a network device ID, a port ID of a network device, and a line ID, based on line connection information among network devices belonging to each node connected to both ends of at least one line,
   wherein the generating of the network device vector comprises:
   detecting node IDs with the same line ID;
   selecting at least one network device ID matched to each of the detected node IDs; and
   generating a network device vector for each node ID, each of which has the selected network device ID as an element.

7. The method of claim 6, wherein a same conduit ID or a different conduit ID is assigned to the line ID, and
   wherein the network device vector has network IDs having different port IDs as elements, when the same conduit ID is assigned to the line ID.

8. A line fault detection device, comprising:
   a communication device;
   a memory storing instructions; and
   a processor communicatively coupled to the communication device and the memory, wherein the processor is configured to execute the instructions to:
   generate a network device vector for each node of a plurality of nodes, each node having network devices connected to both ends of a line as elements;
   based on occurrence of a communication alarm, set an element corresponding to a network device in which the communication alarm occurred as a communication state according to the communication alarm and determine a state of the line based on the communication state set on the network device vector;
   set the elements of the network device vector generated for each vector so that the network devices connected to each other through the line correspond to each other; and
   determine whether a fault occurred in the line based on a result of a logical operation of a pair of network device vectors corresponding to the line, and determine the network device where the fault occurred based on the communication state set in the network device vector.

9. The line fault detection device of claim 8, wherein the processor is further configured to execute the instructions to:
   generate a first network device vector that has, as an element, at least one first network device belonging to a first node connected to one end of the line, and a second network device vector that has, as an element, at least one second network device connected to each of the at least one first network device and belonging to a second node connected to the other end of the line; and
   set an element of the first network device in which a fault alarm occurred, among the elements of the first network device vector, as a communication state according to the fault alarm, and set an element of the second network device in which the fault alarm occurred, among the elements of the second network device vector, as the communication state according to the fault alarm.

10. The line fault detection device of claim 9, wherein the communication state comprises a normal state and a fault state, and
    wherein the processor is further configured to execute the instructions to:
    determine a state of the line depending on whether the communication state of each element of a result vector derived from an OR operation between the first network device vector and the second network device vector is at least one of the normal state and the fault state.

11. The line fault detection device of claim 10, wherein the processor is further configured to execute the instructions to:
    determine the state of the line as the normal state when all elements of the result vector represents the normal state;
    determine the state of the line as the fault state when all elements of the result vector represents the fault state; and
    determine the state of the line as a partial fault state when some elements of the result vector represents the fault state.

12. A network control system, comprising:
    a line fault detection device comprising:
    a communication device;
    a memory storing instructions; and
    a processor communicatively coupled to the communication device and the memory, wherein the processor is configured to execute the instructions to:
    generate a network device vector, for each line, including communication states of network devices interconnected through the line as elements; and
    generate line state information by determining a state of the line based on the communication states; and
    a line management device configured to:
    receive, from the line fault detection device, the line state information;
    measure the state of the line identified from the line state information;
    determine the state of the line based on a result of measuring the state of the line; and
    provide the determined state of the line to the line fault detection device.

13. The network control system of claim 12, wherein the processor is further configured to execute the instructions to:
    generate the network device vector for each node connected to both ends of the line;
    when a communication alarm occurs, set an element corresponding to the network device in which the communication alarm occurs among the elements of the network device vector as a communication state represented by the communication alarm; and determine the state of the line as at least one of a normal state, a fault state, and a partial fault state by using the communication state.

14. The network control system of claim 12, wherein the line management device is further configured to:

perform optical loss measurement for the line identified from the line state information with an optical time domain reflectometer (OTDR);

determine at least one of the fault state and the normal state of the line based on a result of the optical loss measurement;

provide the determined state of the line to the line fault detection, device; and perform failover based on a determination that the line is in the fault state based on the result of the optical loss measurement.

* * * * *